April 14, 1931.   W. D. COLLINS ET AL   1,800,718
FLOATING MOTOR PULLEY
Filed Oct. 12, 1926
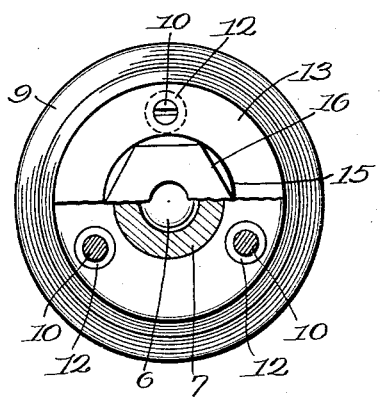
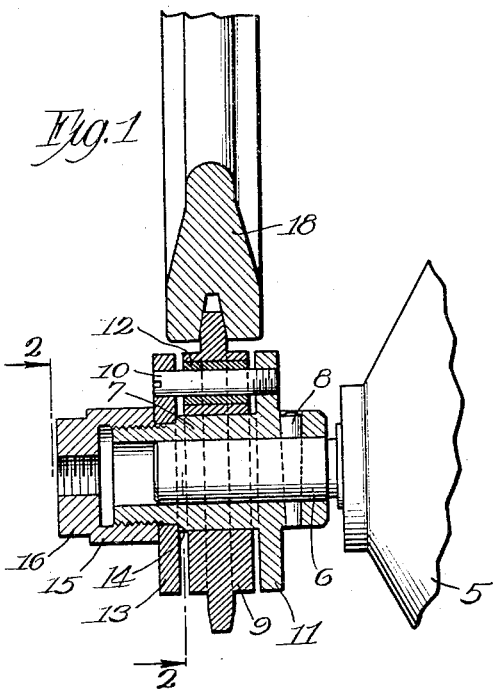
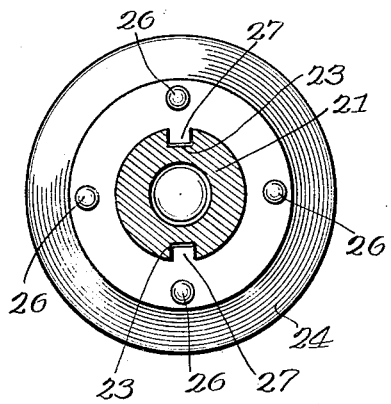
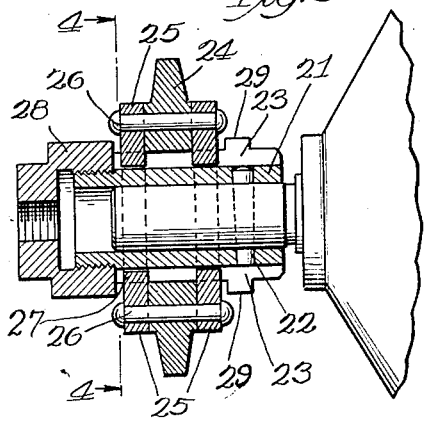
Inventors:
W. D. Collins and E. Widerberg
By Williams, Bradbury, McCaleb & Hinkle
Attys.

Patented Apr. 14, 1931

1,800,718

UNITED STATES PATENT OFFICE

WILLIAM D. COLLINS AND ELMER WIDERBORG, OF EVANSVILLE, INDIANA, ASSIGNORS, BY MESNE ASSIGNMENTS, TO SERVEL, INC., OF NEW YORK, N. Y., A CORPORATION OF DELAWARE

FLOATING MOTOR PULLEY

Application filed October 12, 1926. Serial No. 141,137.

Our invention relates to friction drive mechanisms and has for its object the provision of an improved mechanism of this class which is simple in construction, efficient in operation and which may be economically manufactured.

More specifically it is the object of our invention to provide an improved friction driving pulley, for use on the armature shaft of a motor, which is slidable on the shaft and will thus permit the armature to move freely in seeking its field.

With the above and incidental objects in view, the invention consists in certain novel features of construction and combination of parts, the essential elements whereof are recited in the appended claims and the preferred forms of embodiment of which are described in detail hereinafter and illustrated in the accompanying drawings in which Fig. 1 is a vertical cross sectional view of the friction drive mechanism in which the driving pulley is shown as attached to the shaft of a motor;

Fig. 2 is a half sectional view thereof taken on the line 2—2 of Fig. 1;

Fig. 3 is a vertical cross sectional view of a modified form of driving pulley, and Fig. 4 is a cross sectional view thereof taken on the line 4—4 of Fig. 3.

In friction V drive mechanisms wherein the one pulley comprises a disc which meshes with a circumferential groove in the other pulley, it is, of course, necessary that the two pulleys be maintained in accurate alignment with each other to insure smooth running and even wearing of the parts. When the driving pulley is on a motor shaft, it is difficult to maintain the pulleys in alignment because of the tendency of the armature of the motor to shift axially in seeking its electro-magnetic field. It is, therefore, desirable to have the driving pulley axially slidable on the armature shaft so as to prevent unnecessary wear on the friction disc of the driving pulley, loss of power, and to eliminate vibration and noise.

In Figs. 1 and 2 the end portion of a motor housing is shown at 5 with a projecting end of its armature shaft 6. A flanged body comprising a collar 7 and a flange 11 is secured to the shaft 6 by a tapered pin 8. A disc 9 of fiber or other suitable material fits loosely over the body 7 and is axially slidable thereon. The disc 9 is constrained to rotate with the body 7 by a plurality of pins 10, which screw into the flange 11 which is integral with the body 7. The fiber disc 9 carries metallic bushings 12 which are bored to receive the pins 10. A plate 13, drilled to receive the ends of the pins 10, fits over the end of the body 7 and rests against a shoulder 14 thereon. A cap 15 having internal threads adapted to engage the complementary threads formed on the end of the body 7 has a hexagon-shaped portion 16 by which it may be readily screwed upon the body to force the plate 13 in position abutting the shoulder 14.

It will be apparent that as the armature shaft 6 moves axially it will carry with it the body 7, but the friction disc 9, being in mesh with the groove in the driven pulley 18, will be held in alignment therewith and will slide axially on the pins 10. In this manner the armature and its shaft may freely shift axially in seeking the most desirable magnetic field while the driving pulley "floats" thereon maintaining its position relative to the driven pulley. By removing the nut 15 and the plate 13 the fiber disc 9 may be easily taken from the body for repairs or replacement.

It will be seen that parts 11 and 13 act as stop members limiting the axially extending bearing surface on the collar and that the width of the disc 9 is less than the length of the bearing surface.

In Figs. 3 and 4 a modified construction of the driving pulley is shown. The main features of its construction and operation are essentially similar to those of the above described embodiment, the differences in structure being mainly in details. The body 21 is pinned to the armature shaft 22 and has two diametrically opposite key-ways 23 cut therein. The fiber disc 24 is secured between two metallic plates 25 by a plurality of rivets 26. The plates 25 have key portions 27 which fit in the key-ways or slots 23, thus causing the fiber disc 24 to rotate with the body 21. A flange 29 limits the axial movement of the fiber disc 24 and plates 25 in one direction, while a cap nut 28 threaded over the end of the body 21 limits their movement in the opposite direction. The advantages of this construction are that the friction disc 24 is laterally supported by the metallic plates 25, thus causing it to retain its shape and lengthen its life. The friction disc assembly may be easily removed and replaced by unscrewing the cap nut 28. While in operation the friction disc will maintain its alignment with the driven pulley, since it is freely axially slidable on the body 21.

While we have shown and described particular embodiments of our invention, it is to be understood that we do not wish to limit ourselves to the constructions shown, but desire the scope of our invention to be limited only by the claims which follow:

We claim:

1. A driving mechanism comprising a shaft, a cylindrical collar fixed on said shaft having a smooth outside surface, a flange on said collar, a plate attached to said collar spaced from the flange and leaving a bearing surface therebetween, a disc of narrower width than the bearing surface mounted on the collar between the flange and the plate, axial pins secured to said flange and passing through said disc, the arrangement being such that the disc has axial movement between the plate and the flange and rotates with the shaft due to the pins and a member meshing with the disc.

2. A driving mechanism comprising a driving shaft, a collar secured on said shaft, a flange on said collar at one end thereof, the other end of said collar being cut to form a shoulder and screw-threaded beyond the shoulder, a disc surrounding the collar having a width less than the distance between the shoulder and the flange, a plate secured on the collar and against the shoulder, pins extending between the flange and plate and through the disc, the arrangement being such that the disc can slide axially between the flange and the plate and rotates with the shaft due to the pins and a pulley meshing with the disc to be driven thereby.

3. A driving mechanism comprising a shaft, a collar fixed on said shaft having a smooth external surface, a flange on said collar, a plate secured to said collar spaced from the flange and leaving a bearing surface therebetween, a disc of narrower width than the bearing surface mounted on the collar between the flange and the plate, means permitting free axial movement of said disc on the collar between the flange and the plate and causing the disc to rotate with the shaft and a member meshing with the disc whereby said disk will follow the movement of said meshing member.

4. A driving mechanism comprising a shaft, a collar fixed on said shaft having an exterior axially extending bearing surface, stop members secured to said collar limiting the extent of the bearing surface, a disc on said collar of less width than the length of the bearing surface, and axially extending means passing through the disc permitting free axial movement of said disc on the collar between the stop members and causing the disc to rotate with the shaft.

In witness whereof, we hereunto subscribe our names this 24 day of Sept., 1926.

WILLIAM D. COLLINS.
ELMER WIDERBORG.